United States Patent [19]

Siebrasse

[11] Patent Number: 5,214,624
[45] Date of Patent: May 25, 1993

[54] DISPLAY DEVICE HAVING A SCALE

[76] Inventor: Christoph R. Siebrasse, Denglerstrasse 12, 5300 Bonn 2 - Bad Godesberg, Fed. Rep. of Germany

[21] Appl. No.: 784,970

[22] Filed: Oct. 30, 1991

[30] Foreign Application Priority Data

Oct. 30, 1990 [DE] Fed. Rep. of Germany ..... 69015030

[51] Int. Cl.⁵ .................. G04C 19/00; G04C 17/00
[52] U.S. Cl. ........................... 368/82; 368/239
[58] Field of Search ................ 368/79, 82-84, 368/223, 228, 239-242

[56] References Cited

U.S. PATENT DOCUMENTS

| | | | |
|---|---|---|---|
| 3,574,992 | 4/1977 | Ladas | 368/223 |
| 4,130,987 | 12/1978 | Schickedanz | 368/282 |
| 4,279,031 | 7/1987 | Dostoomian | 368/82 |
| 4,752,919 | 6/1988 | Clark | 368/223 |

FOREIGN PATENT DOCUMENTS 1569516 2/1978 United Kingdom.

OTHER PUBLICATIONS

Journal of Applied Physics; vol. 44, No. 11, Nov. 1973-pp. 4800 & 4801.

*Primary Examiner*—Vit W. Miska
*Attorney, Agent, or Firm*—Anthony J. Casella; Gerald E. Hespos

[57] ABSTRACT

A substantially linear display device including a substantially linear scale and a pointer which marks an area of the scale to be indicated. The display device may be used to indicate time and can be incorporated into a wrist watch. The display device may incorporate an LCD module with segments to indicate time being controlled by a controlled pulse generator having a quartz control.

9 Claims, 1 Drawing Sheet

DISPLAY DEVICE HAVING A SCALE

BACKGROUND OF THE INVENTION

The present invention relates to a display device having a scale.

Display devices in round shape are already known in which a rotating pointer marks the values to be indicated Furthermore, digital display devices are known in which the value to be indicated is represented by a sequence of digits.

It has been found that an indication in the form of an analog pointer means has the advantage over said digital means that it can be immediately noted visually by the user. Analog pointer means in the form of a rotating pointer have, however, the disadvantage that a substantially round dial must be selected for the direct visual perception of the value indicated.

The object of the present invention is, therefore, to provide a display device which has the advantages of an analog visual indication, with which the value indicated can be read conveniently even in the case of scales having smaller dimensions.

SUMMARY OF THE INVENTION

The invention discloses a display device having a substantially linear scale and a pointer means which marks on the scale a value to be indicated. With a linear scale it is possible to extend the graduated area in such a manner that the value marked can be directly perceived even in the case of small linear dimensions.

It is preferred that the pointer means have a colored area the boundary of which represents the value to be indicated. In this way, a pointer-less display is obtained which operates only with colored areas. Since the edges of such colored areas are directly perceptible, a visual indication is possible.

As an alternative it is preferred that the pointer means has two areas of different color, the boundary line between them representing the value to be indicated. With two adjoining color areas, a particularly clear boundary is defined which marks the indicated value on the scale.

As an alternative, it is preferred that the pointer means have a display bar. Such a display bar provides a convenient color-independent indication which is simple to produce.

It is, furthermore, preferred that the scale have a linear marking with equal distances between the scale marks. Such linear markings with equal distances between the scale values increase the utility of the indication since the user can note the approximate indicated value from the marking even from a greater distance away.

The display device is preferably characterized by a multipartite scale and/or a multipartite pointer means, each pointer means having at least one scale associated with it. Such a division of the scale and/or of the display means serves for a differently detailed display or different display regions. This display device may be used in cases where a single scale is not sufficient for all display ranges.

It is, furthermore, preferred that the scale have different time scales, the time scales being designed for indication of hours, minutes and/or seconds. Such display devices, which are known also as watches in the most varied form, may be used as explained herein for an exact indication of time.

It is, furthermore, preferred that the pointer means have segmented pointer areas, a second, minute and/or hour which is elapsed corresponding continuously to a connected segment. In this way, there is produced a certain pointer area which increases during the course of time, the displayed pointer area being increased by one segment upon the expiration of a unit of time.

It is, furthermore, preferred that the pointer means have a two-colored segmented pointer area, each segment having a base color in disconnected state and a display color in connected states. In this way, there is obtained a clear color boundary which marks the indicated value of the scale, each segment having a display color in a connected state and a base color in disconnected state. The base color can, for instance, be produced by a background color in the case of transparent segments. In this case, it would be sufficient to use segments, for instance LEDs or LCDs, of a single color.

It is preferred that one time scale have an hour graduation from 6:00 a.m. to 6:00 p.m. and from 6:00 p.m. to 6:00 a.m. respectively and preferably a minute graduation of, in each case, 0 min to 60 min integrated therein. In this way, there is obtained a display from early morning until early evening which has a convenient graduation which is adapted to the work day while a different graduation is switched to for the later evening and the night. The scale is, therefore, adapted to the work rhythm of working people. The integrated minute graduation serves as a subdivision of the hour scale so that fractions of an hour can also be read.

It is furthermore, preferred that one time scale have a minute graduation from 0 min to 60 min and preferably a second graduation integrated therein from, in each case, 0 sec to 60 sec. With this minute scale, a convenient display of minutes is possible a segment displaying a fraction of a minute being provided for each second.

An hour scale with integrated minute scale preferably has an hour graduation which is so segmented that one segment is turned on for each full hour. In this way, said integrated minute graduation enters into effect. This display has certain advantages over a pure hour scale since, as a rule, the space between two adjacent hour scale marks is so small that a sufficiently precise indication of minutes is not possible In this case, the indication of each full hour is advisable, in which connection the exact minute value can be conveniently read off by means of a minute scale located alongside of it.

It is furthermore, preferred that &he segments be formed in an LCD module and are connected by pulses from a controlled pulse generator. The display device of the invention requires a controlled pulse generator which connects and disconnects the segments one after the other for the connecting and disconnecting of the segments. For this purpose there are used ordinary pulse generators such as already customary in clocks. The pulse generator can give off a pulse every second or only every minute if the indication of seconds is to be dispensed with.

Finally, it is preferred that the pulse generator have a quartz control. Such quartz controls have proven satisfactory in watches and are known as precise time indicators. The frequency of the quartz control can possibly be divided or stepped down electronically in order to obtain a useable second frequency.

Other advantages, features and possible uses of the present invention will become evident from the following description of two embodiments, read in conjunction with the drawings.

DETAILED DESCRIPTION OF THE PREFERRED EMBODIMENTS

Figures 1, 2:
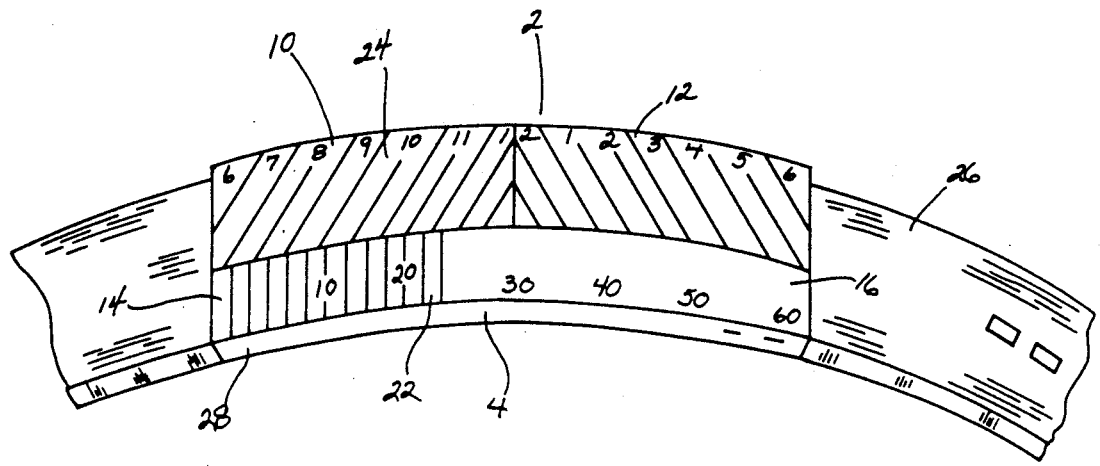
FIG. 1 shows a display device in accordance with the invention with linear scale and a pointer means in the form of segmented pointer areas.
FIG. 2 shows an alternative display device in accordance with the invention with a pointer means in the form of a display bar.

The embodiment of the display device of the invention, which is shown in FIG. 1 has an arm band 26 and a watch case 28 fastened to it. The arm band 26 and the case 28 are integrated with each other so that the case 28 optically forms a continuation of the arm band 26.

The case 28 has an upper hour scale 2 and a separate minute scale 4 located below it. The upper hour scale 2 is formed by uniformly spaced hour numbers, commencing with 6, 7, 8, 9, 10, 11, 12, 1, 2, 3, 4, 5 up to 6. They represent the hours from 6 a.m. to 6 p.m. Corresponding to the hour scale 2, there is provided a pointer area associated directly alongside the scale numbers and which has a substantially linear, slightly arched rectangular shape. The pointer area consists of the display area 10 and the base area 12 for the hour display. The base area 12 extends over the entire width of the pointer area and is developed as a single-color background area. The base area 12 is covered by a differently colored display area 10 which extends over any desired region of the base area 12. The display area 10 is developed in the form of narrow segments 24 which extend obliquely or at right angles to the graduation and form a continuous display area 10. The shape of the segments 24 can be trapezoidal as shown in FIG. 1. However, a shape which extends at right angles to the graduation is also possible, as present in the case of the segments 22 shown in FIG. 1. The hourly increasing display area 10 increases from 6 a.m. to 12 noon, when half of the display area is filled up and increases further up to 6 p.m., where the entire pointer area of the hour display is filled up. From 6 p.m. on, the display area 10 formed by the segments 24 decreases again, starting from 6:00 on the left, which is achieved by the disconnecting of the segments. In this way, the base area 12 again becomes evident and the travelling boundary area between the freed base area 12 and with the drawing display area 10 forms the marking representing the display value on the scale.

Below the pointer area for the hours, there is a corresponding indicator area for the minutes, bearing a minute scale 4. The pointer area for the minutes also consists of a base area 16 in the form of a single-colored background color and a display area 14 in the form of parallel rectangular segmented strips 22. The strips 22 are so narrow that they also permit a display of seconds which is integrated in the minute display. After the end of each unit of time, a segment is connected so that the display area 14, during the course of the time from 0 minutes to 60 minutes, increasingly covers the entire pointer area for the minutes so that the base area 16 disappears. After reaching the scale point for 60 minutes, all segments are disconnected so that the display area 14 disappears. The display area 14 then begins to start up again.

The segments consist of LEDs or LCLs or any desired other known area display. The segments are connected and disconnected by a controlled pulse generator arranged in the case 28. The pulse generator has a suitable quartz control which sees to precise synchronization.

As an alternative, the segments 22 and 24 can be so narrow that a quasi-continuous display is obtained.

The alternative embodiment of the display device of the invention which is shown in FIG. 2 also has an upper hour scale 6 and a lower minute scale 8, an upper pointer area corresponding to the upper hour scale 6 and a lower pointer area corresponding to the lower minute scale 8. The two pointer-area display fields are separated from each other as in FIG. 1. The upper pointer area for the hours is also developed in segments, but, differing from FIG. 1, only one segment in the form of an hour bar 18 is connected. The segments are so controlled that after the expiration of each time unit, the hour bar 18 is disconnected and travels further by the connection of the following adjacent segment. In this way, the hour display is produced. The hour scale has linear equally spaced scale marks from 6 a.m. through 12 noon to 6 p.m. Accordingly, the hour bar 18 travels from 6 a.m. to 6 p.m. transversely over the pointer area. After it has passed over the entire pointer area, it commences to travel again at 6 p.m. so that at 6 a.m. it has again passed over the entire pointer area.

Below the pointer area for the hours, there is arranged a similar pointer area for the minutes, namely corresponding to the minutes scale 8. Over this pointer area there travels a minute bar 20 which is formed by connected segments and, commencing from the left edge of the pointer area, travels up to the right edge of the pointer area in the course of 60 minutes. The segments are so narrow that the minute bar 20 advances each minute, so that in the course of 60 minutes it passes over the entire pointer area. After the expiration of 60 minutes, the minute bar 20 again appears at the left hand edge and commences a new cycle.

Both bars 18 and 20 are connected and disconnected by a controlled pulse generator which corresponds to the one described in FIG. 1.

Said two embodiments of the display device of the invention are used on all types of watches and clocks, for instance, wrist watches, wall clocks, table clocks, facade clocks, etc. Furthermore, thermometers, hydrometers, tarometers and other measuring instruments, without limitation, enter into consideration.

In a further embodiment of the invention a pointer means in the form of a rotating colored band is provided, it being held on two spaced pulleys. The band has essentially the width of the case and is colored with one color in its one part and with a different color in its other part. The boundary line between the two colors marks the value to be displayed. On a case containing the band, there are applied, on both sides, scale marks of a time scale which extends from 6 a.m. to 6 p.m. The scale marks can, in this connection, preferably be so divided over the two edges that the scale marks for 6:00, 12:00 and 6:00 are arranged on one side of the case while the scale marks for 9:00 and 3:00 are arranged in arabic numerals on the other side. The intermediate values are marked simply by small scale lines.

As an alternative, as stated above, a display can be provided in the form of an LCD module which has a number of pixels of $X \times Y$. The pixels are controlled individually or segmentwise by a control device so that each segment can be connected and disconnected.

The LCD module can be a traditional passive module which is controlled by external drive electronics. As an alternative, however, it also can be an active LCD module, the liquid-crystal cells of which are connected directly with thin-film transistors. In this way, it is possible to provide a multi-layer display with different color filters arranged in between, instead of a single-layer display.

LCD-modules to be used within the present invention can be structured in a number of ways. One way uses the so-called DAP effect where two polarizing plates and liquid crystal material with a homeotropic type alignment are used, the vertical orientation of the molecules of the liquid crystal material being changed when a voltage is impressed across the liquid crystal material. The color is produced by the birefringence of liquid crystal material due to the change of orientation of the molecules of the liquid crystal material.

Another way is to use the guest-host (GH) effect where dyes are incorporated in liquid crystal material, the color being produced due to the fact that the dye absorbs a light of a given wavelength. Yet another way uses the twisted nematic (TN) effect, where colored polarizing plates are used.

In a preferred embodiment the LCD-module according to the present invention comprises a first liquid crystal display cell having a second liquid crystal display cell superposed thereon, each display cell comprising a layer of liquid crystal material disposed between two electrodes for applying an electric field to the layer, the layer of the first display cell being switchable in use to have an optical rotary angle of substantially 90° or 0° according to the voltage between its electrode, and the layer of the second display cell having positive dielectric anisotropy and having a parallel homogeneous alignment in the absence of an electric field. The layer of the second display cell contains a dichroic dye whose molecules are cooperatively oriented by molecules of the liquid crystal material. Further it comprises polarizing means for polarizing light incident upon the first display cell, and filter means comprising an optical element capable of exhibiting a linearly polarizing property. The second display cell is sandwiched between the first display cell and the filter means. In a preferred embodiment the filter means is a colored polarizing plate. In another embodiment the filter means comprises at least one further liquid crystal display cell containing a liquid crystal material and a dye. A liquid crystal unit may alternatively comprise a first transparent plate, preferably of glass, and a second transparent plate, also of glass and extending parallel to the first plate. The space between the two plates is filled with a layer of nematic liquid crystal material.

An alternative crystal device comprises a liquid crystal cell capable of rotating the plane of polarized light, at least one layer of a birefringent material arranged parallel to the cell, a polarizer also arranged parallel to the cell and means for applying a variable voltage across the liquid crystal cell. The birefringent material may be one or more layers of cellulose film, polyvinyl alcohol film, or polyvinyl fluoride film.

In accordance with the present invention one liquid crystal cell together with a specific filter may be of one color, while a superposed liquid crystal cell together with a specific filter means may be of another color. In this way the two colors may be contiguous and form a two-color display area.

I claim:

1. A time display device comprising:
   an elongated case having opposed spaced apart first and second ends and parallel side extending between the ends;
   an hour scale disposed on the case parallel to the sides and having hour indicia corresponding to each of twelve consecutive hours;
   a minute scale disposed on the case parallel to the sides and having minute indicia corresponding to selected intervals of minutes in an hour;
   an hour time display having first through twelfth electro-optical emitters consecutively disposed between the respective first and second ends of the case in a linear array, each said emitter being operative to selectively display either of first and second hour colors;
   a minute time display having a plurality of electro-optical emitters disposed between the respective first and second ends of the case in a linear array substantially adjacent and parallel to the hour time display, each said emitter of the minute time display being operative to selectively display either of first and second minute colors; and
   electrical control means disposed in the case and connected to the electro-optical emitters for generating timed signals for selectively changing the colors of the emitters so as to define an hour boundary between emitters of the first and second hour colors and a minute boundary between emitters of the first and second minute colors, the signals being operative to move the minute boundary from the first end of the case toward the second end of the case at selected minute intervals for sequentially aligning the minute boundary with the respective minute indicia, the signals further being operative to move the hour boundary from the first end of the case toward the second end at hourly intervals for sequentially aligning the hour boundary with the respective hour indicia, the signals further being operative to move the minute boundary from the second end of the case to the first end at the end of each hour interval and to move the hour boundary from the second end of the case to the first end at the end of each of said twelve consecutive hours.

2. A time display device as in claim 1, wherein the hour indicia defines the numbers 6, 7, 8, 9, 10, 11, 12, 1, 2, 3, 4, and 5 respectively for identifying time between 6 a.m.—6 p.m. and 6 p.m.—6 a.m.

3. A time display as in claim 1, wherein the watch case defines a width aligned transverse to the first and second time displays, the first and second time displays each defining widths, the sum of the widths of the first and second time displays being substantially equal to the width of the watch case, such that the first and second time displays occupy substantially the entirety of the width of the watch case.

4. A time display device as in claim 1, wherein the electro-optical emitters of the hour time display are obliquely aligned to the sides of the case such that the hour boundary defines a pointer aligned with a selected indicia on the hour scale.

5. A time display device as in claim 1, wherein the electro-optical emitters of the minute time display are obliquely aligned to the sides of the case such that the minute boundary defines a pointer aligned with a selected indicia on the minute scale.

6. A time display device as in claim 1 further comprising a flexible band, said case being attached to the flexible band such that the case and the flexible band define a continuous loop, the case extending less than completely around said loop.

7. A time display device as in claim 1, wherein the watch case includes a second scale disposed on the case parallel to the sides and having second indicia corresponding to selected intervals of seconds in a minute.

8. A time display device comprising:
- an elongated case having opposed spaced apart first and second ends parallel sides extending between the ends;
- a flexible band, said case being attached to the flexible band such that the case and the flexible band define a continuous loop, the case extending less than completely around said loop;
- an hour scale disposed on the case parallel to the sides and having hour indicia defining the numbers 6, 7, 8, 9, 10, 11, 12, 1, 2, 3, 4, and 5 respectively for identifying time between 6 a.m.—6 p.m. and 6 p.m.—6 a.m.;
- a minute scale disposed on the case parallel to the sides and having minute indicia corresponding to selected intervals of minutes in an hour;
- an hour time display having first through twelfth electro-optical emitters consecutively disposed between the respective first and second ends of the case in a linear array, each said emitter being operative to selectively display either of first and second hour colors, the electro-optical emitters of the hour time display being obliquely aligned to the sides of the case to define pointers aligned with a selected indicia on the hour scale;
- a minute time display having a plurality of electro-optical emitters disposed between the respective first and second ends of the case in a linear array substantially adjacent and parallel to the hour time display, each said emitter of the minute time display being operative to selectively display either of first and second minute colors; and
- electrical control means disposed in the case and connected to the electro-optical emitters for generating timed signals for selectively changing the colors of the emitters so as to define an hour boundary between emitters of the first and second hour colors and a minute boundary between emitters of the first and second minute colors, the signals being operative to move the minute boundary from the first end of the case toward the second end of the case at selected minute intervals for sequentially aligning the minute boundary with the respective minute indicia, the signals further being operative to move the hour boundary from the first end of the case toward the second end at hourly intervals for sequentially aligning the hour boundary with the respective hour indicia, the signals further being operative to move the minute boundary from the second end of the case to the first end at the end of each hour interval and to move the hour boundary from the second end of the case to the first end after 6:00 a.m. and after 6:00 p.m.

9. A time display device as in claim 8, wherein the watch case includes a second scale disposed on the case parallel to the sides and having second indicia corresponding to selected intervals of seconds in a minute.

* * * * *